J. N. WILLIAMS AND H. C. MIDDLETON.
VACUUM OPERATED COW MILKER.
APPLICATION FILED JUNE 27, 1921.

1,428,670.

Patented Sept. 12, 1922.
2 SHEETS—SHEET 1.

Patented Sept. 12, 1922.

1,428,670

UNITED STATES PATENT OFFICE.

JOSEPH NORMAN WILLIAMS, OF PUKEATUA, AND HARRY CYRIL MIDDLETON, OF TE AWAMUTU, NEW ZEALAND.

VACUUM-OPERATED COW MILKER.

Application filed June 27, 1921. Serial No. 480,807.

*To all whom it may concern:*

Be it known that JOSEPH NORMAN WILLIAMS and HARRY CYRIL MIDDLETON, of Pukeatua and Te Awamutu, respectively, in the Dominion of New Zealand, farmers, citizens of the British Empire, have invented certain new and useful Improvements in Vacuum-Operated Cow Milkers, of which the following is a specification.

This invention relates to vacuum operated cow milkers and its principal object is for detecting all leakages that may at any time occur in the teat cups of the cow milker and so that same may be repaired without stopping the working of the whole of the teat cups of the cow milker. A further object is to prevent any milk or foreign matter from getting up into the usual well known over head vacuum pipe pulsator and vacuum tank. The invention consists in the device having the features and combinations and arrangements of parts herein described and more particularly pointed out in the claim.

Figure 1:
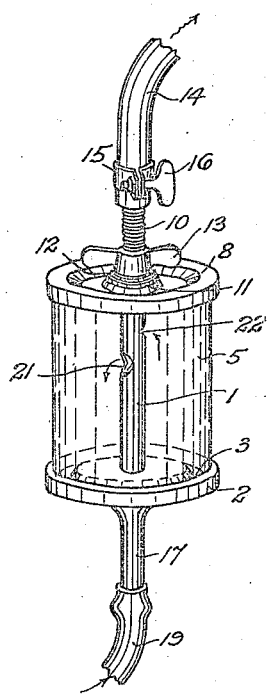
Figure 2:
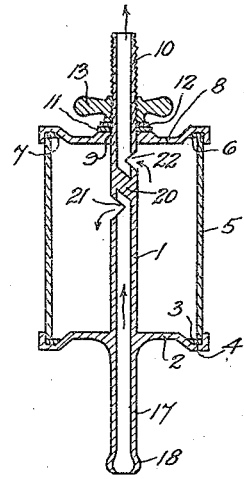
Figure 3:
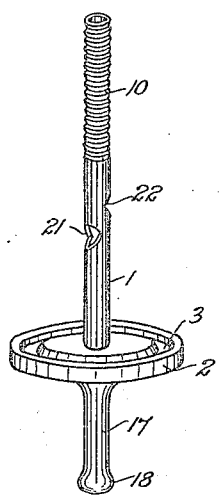
Figure 4:
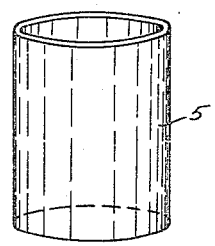
Figure 5:
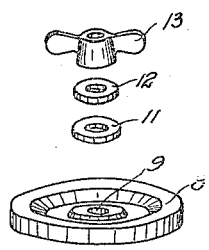
Figure 6:
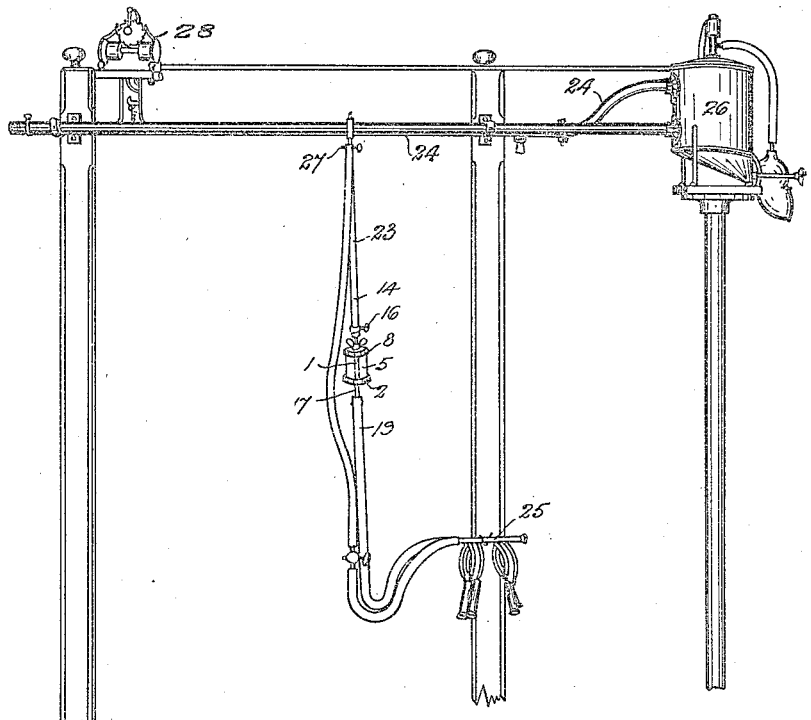

An embodiment of the invention in constructional form is illustrated in the accompanying drawings in which Figure 1 is a perspective elevation of the device, Figure 2 is a sectional elevation of the device, Figure 3 is a perspective elevation of the central pipe and bottom disc, Figure 4 is a perspective elevation of the transparent vessel surrounding the central pipe, Figure 5 is a perspective elevation showing the top disc, rubber washer, metal washer and wing nut in their respective positions but separated for clearness, Figure 6 is a diagram of a cow milker showing the device in position.

Referring to these drawings the usual vertical air pipe 23 leading to the pulsator 28 and overhead vacuum pipe 24 is severed and a piece taken out and the upper portion 14 of the vertical air pipe 23 is connected again to the lower portion 19 thereof by a preferably metal central pipe 1. The upper end 10 of this central pipe 1 is screwed or threaded and enters the upper portion 14 of the air pipe 23 said portion 14 being detachably secured to the end 10 by clamp 15 operated by thumb screw 16. The lower part 17 of the central pipe 1 has an enlarged end 18 over which the upper end of the lower portion 19 of the air pipe 23 is secured by stretching. This lower portion 19 of the air pipe 23 is connected to a set of teat cups 25 of the cow milker in the usual well known manner. To the central pipe 1 is secured the bottom disc 2 which has an annular groove 3 as a seating for a packing ring 4 see Figure 2. At the upper end preferably of the central pipe 1 is a notched aperture 22 at one side thereof and on the other side thereof a little lower down is a similar notched aperture 21, a blocking piece 20 in the pipe 1 being inserted between the two apertures so as to block the pipe 1. Seated on the packing ring 4 is the transparent vessel 5 preferably cylindrical surrounding the central pipe 1. An upper disc 8 provided with a hole 9 slightly larger than the pipe 1 which goes through the hole 9 has an annular groove 7 as a seating for a packing ring 6 see Figure 2 which sits on the upper end of the transparent vessel 5. This upper disc 8 is kept tightly in airtight position by rubber washer 11, metal washer 12 and wing nut 13 which screws on the threaded portion 10 of the central pipe 1 and by means of which the upper disc is pressed tightly on to the upper edge of the vessel 5 and the lower edge of the vessel 5 is pressed tightly to the lower edge 2 rendering the vessel 5 airtight. The vacuum caused by the operation of the cow milker in the air pipe 23 draws up from the teat cups 25 through lower portion 19 into central pipe 1 up to the aperture 21 below blocking piece 20 and through aperture 21 into transparent vessel 5, thence through aperture 22 through pipe 1 and thence through upper portion 14 of air pipe 23 to the pulsator 28 and overhead vacuum pipe 24. Should a leak occur in the teat cups, milk and any foreign matter on the teats or teat cups are drawn up by the vacuum above described and appear trapped in the transparent vessel 5 where they are seen on inspection. To repair the leak and remove foreign matter from the vessel 5 the air pipe 23 is cut off from the system by means of the usual cock 27 and thereupon the set of teat cups 25 connected with the lower portion 19 of the air pipe 23 is put out of action, the vessel 5 may be removed and leaks may be repaired and foreign matter removed from the vessel 5 without stopping the operation of the other sets of teat cups of the cow milker.

We claim:—

In combination with the vertical air pipe of vacuum operated cow milking apparatus, a central pipe interposed in said vertical air pipe and having upper and lower openings in its sides and a block between said openings, and an airtight transparent vessel secured to and surrounding said central pipe.

In testimony whereof they affix their signatures in presence of two witnesses.

JOSEPH NORMAN WILLIAMS.
HARRY CYRIL MIDDLETON.

Witnesses:
EDITH HAMILTON McHAFFIE,
LYNDON CLEMENT HEMENWAY.